Patented Jan. 16, 1951

2,538,139

UNITED STATES PATENT OFFICE 2,538,139

BIOTIN DERIVATIVES AND PROCESSES OF PREPARING THE SAME

Donald E. Wolf, Franklin Township, Somerset County, and Karl Folkers, Plainfield, N. J., assignors to Merck & Co., Inc., Rahway, N. J., a corporation of New Jersey No Drawing. Application July 1, 1947,
Serial No. 758,486

15 Claims. (Cl. 260—309)

This invention is concerned generally with novel chemical compounds and processes of preparing the same. More particularly, it relates to novel biotin derivatives which possess physiological activity as growth promoting factors for microorganisms.

The novel chemical compounds forming the subject matter of the present invention are the biotin amides and biotin aromatic amines. It has been established with reasonable certainty that these novel compounds have the following structural formula:

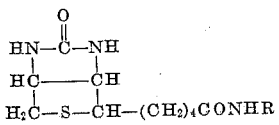

wherein R represents hydrogen, aryl and aralkyl substituents.

In accordance with the present invention these new compounds may be prepared by reacting ammonia, arylamines and aralkylamines with compounds represented by the formula:

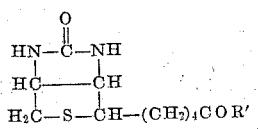

wherein R' represents halogen and alkoxy substituents.

Starting materials of the above formula wherein R is a halogen substituent are fully defined by the name biotin acid halides wherein the carboxyl groups are converted to acid halide groups. These biotin acid halide compounds can be prepared by reacting biotin with phosphorus halides, sulfuryl halides and thionyl halides. This process and the products thereby obtained are fully disclosed and claimed in a copending joint application by the present inventors, Folkers, Mozingo, and Wolf, Serial No. 554,460, filed September 16, 1944, now U. S. Patent No. 2,442,681, issued June 1, 1948.

Compounds of the above formula wherein R represents alkoxy substituents are fully defined as the biotin alkyl esters and dl-biotin alkyl esters.

The amine compounds, which may be employed as reactants in our invention, include ammonia, arylamines, such as aniline and p-aminobenzoic acid, and aralkylamines such as benzylamine.

In carrying out the process of the present invention a biotin acid halide or a biotin ester is reacted with an arylamine, an aralkylamine or ammonia. It is preferable to employ an excess of the amine which may also act as a condensing agent. In the event that the amine is a solid, a condensing agent such as pyridine or sodium hydroxide may be employed. The reaction is preferably conducted at room temperature. When condensation is complete the crystals of the biotin amine compound are removed. While a substantially pure product is recovered by merely filtering off the white crystalline solid and washing with water, further purification may be necessary or desirable. This can be accomplished by recrystallizing the product from methanol.

The following examples illustrate a method of carrying out the present invention but it is to be understood that these examples are given by way of illustration and not of limitation.

Example 1

About 25 mg. of biotin was dissolved in 7 drops of thionyl chloride at room temperature. After five minutes the excess thionyl chloride was removed by evaporation in vacuo. The white crystalline biotin acid chloride obtained was dissolved in 2 ml. of concentrated ammonium hydroxide at room temperature and biotin amide separated from solution as a nearly white solid.

Recrystallization of the product from methanol resulted in pure biotin amide melting at 241–247° C.

Anal. calcd. for $C_{10}H_{17}N_3O_2S$: C, 49.36; H, 7.04; N, 17.27.

C, 49.71; H, 7.11; N, 16.79.

Example 2

About 57 mg. of biotin was treated with 1 ml. of thionyl chloride at room temperature. The biotin dissolved and biotin acid chloride crystallized from solution. The excess thionyl chloride was evaporated in vacuo and the biotin acid chloride which remained was aminated by adding liquid ammonia. After the liquid ammonia had evaporated, the biotin amide remained as a white solid. The product was recrystallized from methanol and had a melting point of 243–248° C.

Anal. calcd. for $C_{10}H_{17}N_3O_2S$: C, 49.36; H, 7.04.
Found: C, 49.58; H, 7.00.

Example 3

About 73 mg. of dl-biotin was treated with 1 ml. of thionyl chloride at room temperature. The excess thionyl chloride was removed by evaporation in vacuo leaving dl-biotin acid chloride as a clear oil. The dl-biotin acid chloride was treated with concentrated ammonium hydroxide and the crystalline dl-biotin amide was filtered from the mixture. The dl-biotin amide was recrystallized from methanol. This product had a melting point of 265–267° C.

Anal. calcd. for $C_{10}H_{17}N_3O_2S$: C, 49.36; H, 7.04; N, 17.27.
Found: C, 48.88; H, 6.67; N, 16.94.

*Example 4*

About 66 mg. of biotin methyl ester was suspended in 10 ml. of concentrated ammonium hydroxide in a closed flask. The mixture was stirred at room temperature for 6 hours. Biotin amide crystallized from the solution as white needles. The biotin amide was removed by filtration, washed with water and dried. The crystals thus obtained had a melting point of 243–244° C.

*Example 5*

100 mg. of biotin was converted to biotin acid chloride by treating it with thionyl chloride as described in Examples 1 and 2. 2 cc. of aniline was added to the biotin acid chloride, and the reaction allowed to stand for approximately 72 hours. The excess of aniline was evaporated in vacuo leaving a solid residue. The product, biotinanilide, was washed with 0.1 N hydrochloric acid, 2% sodium bicarbonate, and water to remove unreacted starting material. The biotinanilide was recrystallized from methanol, giving a white solid melting between 206–210° C.

Anal. calcd. for $C_{16}H_{21}N_3O_2S$: C, 60.16; H, 6.63; N, 13.16.
Found: C, 59.48; H, 6.81; N, 13.40.

*Example 6*

100 mg. of biotin was converted to biotin acid chloride by treating it with thionyl chloride as in Examples 1 and 2. The biotin acid chloride was treated with 1 cc. of benzylamine and the reaction allowed to stand for 15 hours at room temperature. The excess benzylamine was evaporated in vacuo leaving a solid residue. The product, biotin benzylamide, was washed with 0.1 N hydrochloric acid, 2% sodium bicarbonate solution, and water. The biotin benzylamide collected weighed 16.8 mg. and was a white solid belting at 122–125° C.

Anal. calcd. for $C_{17}H_{23}N_3O_2S$: C, 61.24; H, 6.95; N, 12.60.
Found: C, 60.47; H, 7.09; N, 11.76.

*Example 7*

About 100 mg. of biotin was converted to biotin acid chloride by treating it with thionyl chloride. To the biotin acid chloride thus obtained was added 500 mg. of p-aminobenzoic acid dissolved in 2.5 N sodium hydroxide at 0° C. The reaction mixture was stirred until all solid had dissolved and then acidified with hydrochloric acid which caused precipitation of p(biotinylamino) benzoic acid as a white solid. The mixture was filtered, and the solid washed with water. This product was recrystallized from methanol in the form of white crystals.

Anal calcd. for $C_{17}H_{21}N_3O_4S$: C, 56.18; H, 5.83; N, 11.56.
Found: C, 55.63; H, 5.88; N, 11.63.

Modifications may be made in carrying out the present invention without departing from the spirit and scope thereof and the invention is to be limited only by the appended claims.

We claim:
1. A compound of the formula

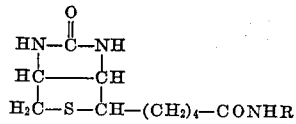

wherein R is selected from the group consisting of hydrogen, aryl, and aralkyl and carboxyaryl substituents.
2. Biotin amide.
3. dl-Biotin amide.
4. Biotinanilide.
5. Biotin benzylamide.
6. p(Biotinylamino)-benzoic acid.
7. The process that comprises reacting a substance selected from the class consisting of ammonia, arylamines, aralkylamines and carboxyarylamines with a compound of the formula

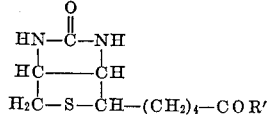

wherein R' is selected from the group consisting of halogen and alkoxy substituents to form the corresponding biotin amine compound.
8. The process that comprises reacting ammonia with a compound of the formula

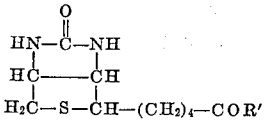

wherein R' is selected from the group consisting of halogen and alkoxy substituents to form biotin amide.
9. The process that comprises reacting biotin acid halide with ammonia hydroxide to form biotin amide.
10. The process that comprises reacting dl-biotin acid halide with ammonium hydroxide to form dl-biotin amide.
11. The process that comprises reacting biotin methyl ester with ammonium hydroxide to form biotin amide.
12. The process that comprises reacting dl-biotin methyl ester with ammonium hydroxide to form dl-biotin amide.
13. The process that comprises reacting biotin acid halide with aniline to form biotinanilide.
14. The process that comprises reacting biotin acid halide with benzylamine to form biotin benzylamide.
15. The process that comprises reacting biotin acid halide with p-aminobenzoic acid in the presence of sodium hydroxide, and acidifying the resulting mixture with an inorganic acid to precipitate p(biotinylaminobenzoic) acid.

DONALD E. WOLF.
KARL FOLKERS.

REFERENCES CITED

The following references are of record in the file of this patent:

UNITED STATES PATENTS

| Number | Name | Date |
|---|---|---|
| 2,441,141 | Folkers et al. | May 11, 1948 |
| 2,472,458 | Baker et al. | June 7, 1949 |

OTHER REFERENCES

Du Vigneaud: J. A. C. S., vol. 64, pp. 188–189.
Hofmann: J. A. C. S., vol. 66, pp. 51–53.